P. H. THOMAS.
MEANS FOR MAINTAINING VAPOR CONVERTERS IN OPERATION.
APPLICATION FILED OCT. 19, 1904.
964,336.  Patented July 12, 1910.
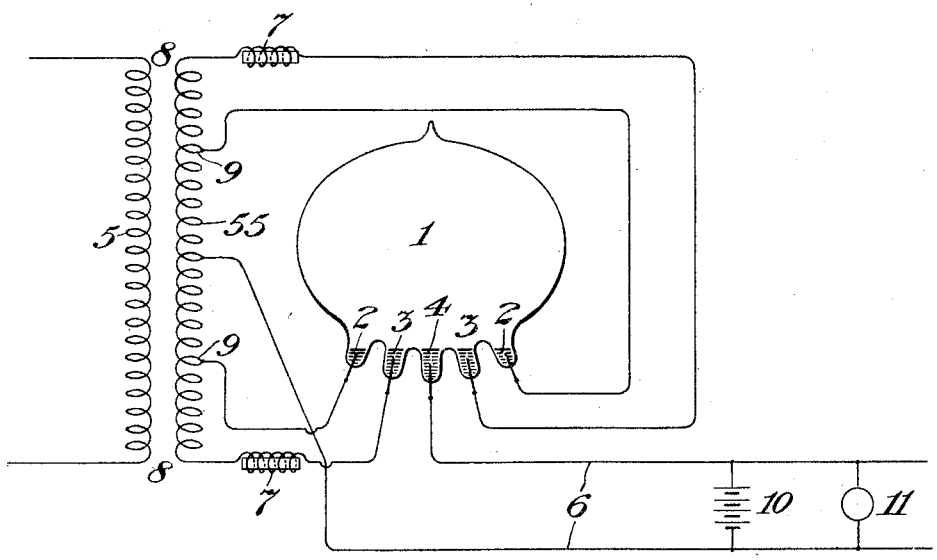
Witnesses
Chas. F. Clagett
W. H. Capel
Inventor
Percy H. Thomas
By Attorney
Charles A. Terry

UNITED STATES PATENT OFFICE.

PERCY H. THOMAS, OF EAST ORANGE, NEW JERSEY, ASSIGNOR TO COOPER HEWITT ELECTRIC COMPANY, OF NEW YORK, N. Y., A CORPORATION OF NEW YORK.

MEANS FOR MAINTAINING VAPOR-CONVERTERS IN OPERATION.

964,336.  Specification of Letters Patent.  Patented July 12, 1910.

Original application filed December 24, 1903, Serial No. 186,488. Divided and this application filed October 19, 1904. Serial No. 229,047.

*To all whom it may concern:*

Be it known that I, PERCY H. THOMAS, a citizen of the United States, and resident of East Orange, county of Essex, State of New Jersey, have invented certain new and useful Improvements in Means for Maintaining Vapor-Converters in Operation, of which the following is a specification.

The present invention relates to means for keeping alive a vapor converter when operated on an alternating current circuit wherein, in the absence of some means for maintaining a flow of current in one direction through the converter, the flow of current would cease.

The invention is especially adapted for use in connection with circuits intended for the charging of storage batteries or for vivifying motors where comparatively small powers are used. By employing the means herein described there is no waste of current such as takes place to a greater or less extent in keeping converters alive by an inductive shunt circuit or by a small transformer. There may be inductive factors in the load, but these may be dispensed with and in any case they are of little consequence with small powers.

Various devices have been proposed for accomplishing generally the result of keeping vapor converters alive, most of which are at a disadvantage in circuits where a counter-electro-motive-force is to be overcome, or cause a considerable waste of current by shunt circuits, or loss of potential by series inductances.

According to the present invention I provide a vapor converter with two supplemental positive electrodes with largely accelerated voltage, and place choke coils in the leads of these two positive electrodes. The small alternating current in these choke coils bridges the zero point in the current from the main positive electrode or electrodes, at the same time passing their current through the load.

In respect to the last feature mentioned, the present device differs from most of those which have heretofore been proposed, wherein the energy utilized for keeping the converters alive has been locally applied to the converter itself without supplying current to the work circuit. In the system herein proposed there is no loss of energy due to resistances, the current being controlled by choke coils.

I have illustrated my invention in the accompanying drawing, which is a section of a vapor converter including a diagram of electrical circuits adapted to the carrying out of my invention.

In the drawing, 1 is the container inclosing two main positive electrodes, 2, 2, and the supplementary positive electrodes, 3, 3, and a negative electrode, 4. Alternating current from a suitable source is made to supply the direct current work circuit, 6, through the vapor converter 1 by way of the electrodes 2, 2 and 4, in a manner already well-known, provided the negative electrode resistance is kept from being re-established. The source referred to may be a transformer having a primary, 5, connected with the terminals of an alternating current generator, and a secondary, 55, which forms the direct means of connection with the system herein described. The supplementary electrodes 3, 3 are connected through choke coils, 7, 7, with points, 8, 8, of the supply, each having a higher potential than the points, 9, 9, connected with the main positives, 2, 2. In the work circuit I may locate a storage battery, 10, and a translating device, 11, of any suitable character adapted to be operated by current of one direction.

It will be understood that the translating devices included in the work circuit may be any direct current translating devices, although, for convenience of illustration, I have shown one of them as a storage battery, because the charging of a storage battery is not so readily and evenly accomplished by other systems of circuits. The other translating device may be a direct current motor using a small amount of electrical energy.

In the system described, the chief portion of the current supplied to the work circuit is delivered through the positive electrodes 2, 2 the function of the supplementary positives 3, 3 being to maintain a suitable current while the natural zero point of the main supply is being passed. To accomplish this result, an accelerated electro-motive-force is supplied to the supplementary positive electrodes, which causes current to flow at appropriate times through the work circuit and through the choke coils 7, 7. The magnitude of these choke coils is such as to absorb the accelerated voltage, leaving approximately the voltage of the positive electrodes 2, 2 for the load. By the action of the accelerated electro-motive-force, it is possible to store a sufficient quantity of energy in the choke coils during one alteration to maintain the necessary current both through the converter and through the load during the natural zero period of the main supply, and this is true even when a storage battery or other source of counter electro-motive-force is included in the load. By these means it is evident that the load can be put in direct communication with the source of power giving as perfect regulation as the supply system can maintain unhampered by choke coils for carrying the load over the dead points and it is seen also that no current passes through the converter without going through the load, thus reducing the requisite capacity of the apparatus.

Considering a main positive electrode and a corresponding supplemental positive electrode, the function of the accelerated electro-motive-force which is made to differ in phase from the main electro-motive-force is to so prolong the passage of current through the negative electrode that it shall not become zero until after current has been established from another electrode. This principle can be applied to any number of main and supplemental electrodes although, for convenience, two main and two supplemental positive electrodes have been illustrated and described.

In another application filed by me on the 24th day of December, 1903, Serial Number 186,488, of which this application is a division, claims are made on the method described herein.

I claim as my invention:—

1. A vapor converter having a plurality of main positive electrodes, a plurality of supplemental positive electrodes, and a common negative electrode, in combination with a source of normal electro-motive-force and connections therefrom to the common negative electrode and the main positive electrodes, a source of accelerated electro-motive-force, and connections therefrom to the common negative and the supplemental positive electrodes.

2. A vapor converter having a plurality of main positive electrodes, a plurality of supplemental positive electrodes, and a common negative electrode, in combination with a source of normal electro-motive-force and connections therefrom to the common negative and the main positive electrodes, a source of accelerated electro-motive-force, and connections therefrom to the common negative and the supplemental positive electrodes, an inductance being interposed in each circuit of the source of accelerated electro-motive-force.

3. In a system of electrical distribution, an alternating current supply circuit and a direct current work circuit including a translating device, in combination with a vapor converter interposed between the described circuits, the said vapor converter being provided with a plurality of main positive electrodes, a plurality of supplemental positive electrodes, and a common negative electrode, the negative electrode being connected to a common terminal of a source of normal electro-motive-force and a source of accelerated electro-motive-force, and the main and supplemental positive electrodes being connected, respectively, to the opposite terminals of the said sources.

4. In a system of electrical distribution, a direct current work circuit containing a translating device, an alternating current source consisting of a transformer whose secondary is adapted to supply the said work circuit, and connections from the said secondary to the work circuit through a vapor converter having a plurality of main positive electrodes, a plurality of supplemental positive electrodes and a common negative electrode, the said negative electrode being connected to an intermediate point of the secondary, the supplemental positive electrodes being connected to the terminals of the said secondary and the main positive electrodes being connected to the secondary at points intermediate between the point of connection for the negative electrode and the points of connection for the supplemental positive electrodes.

5. In a system of electrical distribution, a direct current work circuit containing a translating device, an alternating current source consisting of a transformer whose secondary is adapted to supply the said work circuit, and connections from the said secondary to the work circuit through a vapor converter having a plurality of main positive electrodes, a plurality of supplemental positive electrodes and a common negative electrode, the said negative electrode being connected to an intermediate point of the secondary, the supplemental positive electrodes being connected to the terminals of the said secondary and the main positive electrodes being connected to the secondary at points intermediate between the point of connection for the negative electrode and the points of connection for the supplemental positive electrodes, and an inductance interposed in each circuit between the supplemental positive electrodes and the terminals of the sources.

6. In a system of electrical distribution, an alternating current supply circuit and a direct current work circuit including a translating device having the capacity of developing counter electro-motive-force, in combination with a vapor converter interposed between the described circuits, the said vapor converter being provided with a plurality of main positive electrodes, a plurality of supplemental positive electrodes, and a common negative electrode, the negative electrode being connected to a common terminal of a source of normal electro-motive-force and a source of accelerated electro-motive-force, and the main and supplemental positive electrodes being connected, respectively, to the opposite terminals of the said sources.

7. In a system of electrical distribution, a direct current work circuit containing a translating device having the capacity of developing counter electro-motive-force, an alternating current source consisting of a transformer whose secondary is adapted to supply the said work circuit, and connections from the said secondary to the work circuit through a vapor converter having a plurality of main positive electrodes, a plurality of supplemental positive electrodes and a common negative electrode, the said negative electrode being connected to an intermediate point of the secondary, the supplemental positive electrodes being connected to the terminals of the said secondary and the main positive electrodes being connected to the secondary at points intermediate between the point of connection for the negative electrode and the points of connection for the supplemental positive electrodes.

8. In a system of electrical distribution, a direct current work circuit containing a translating device having the capacity of developing counter electro-motive-force, an alternating current source consisting of a transformer whose secondary is adapted to supply the said work circuit, and connections from the said secondary to the work circuit through a vapor converter, having a plurality of main positive electrodes, a plurality of supplemental positive electrodes and a common negative electrode, the said negative electrode being connected to an intermediate point of the secondary, the supplemental positive electrodes being connected to the terminals of the said secondary and the main positive electrodes being connected to the secondary at points intermediate between the point of connection for the negative electrode and the points of connection for the supplemental positive electrodes, and an inductance interposed in each circuit between the supplemental positive electrodes and the terminals of the sources.

9. In an organization of circuits in which a vapor converter is utilized for transmitting a direct current from an alternating current source to a suitable receiving circuit, means for keeping the converter alive, such means consisting of devices for applying simultaneously to the converter from a single phase electric currents from a plurality of electrodes, and means for causing a difference in the phases of the currents from simultaneously operating sources to produce a continuous overlapping of the current at the negative electrode.

10. A vapor converter having a plurality of main positive electrodes and a plurality of supplemental positive electrodes and a common negative electrode in combination with a source of normal electromotive force, connections therefrom to the common negative and the main positive electrodes, a source of accelerated electromotive force, connections therefrom to the common negative and the supplemental positive electrodes, inductances being interposed in a plurality of the connections from the positive electrodes to the sources.

11. A system of electrical distribution including a vapor converter having a main positive electrode, a supplemental positive electrode and a common negative electrode, in combination with a source of normal electromotive force and connections therefrom to the common negative electrode and the main positive electrode, a source of accelerated electromotive force and a connection therefrom to the common negative electrode and the supplemental positive electrode together with complementary means for maintaining the negative electrode in operative condition.

12. The combination with a single phase alternating current source, a vacuum rectifier comprising an hermetically sealed and completely exhausted container, a vaporizable reconstructing cathode and a plurality of main and supplemental anodes therein, and a direct current work circuit supplied from said rectifier, of means for passing through said work circuit from said source a plurality of currents respectively through the main and supplemental positive electrodes, the phases of said currents overlapping whereby a continuous flow of current is maintained through said negative electrode.

13. In a system of electrical distribution wherein a direct current work circuit is supplied from an alternating current source through a vacuum rectifier comprising an hermetically sealed and completely exhausted container, a vaporizable reconstructing cathode and suitable anodes therefor, a current path from a terminal of the source through an anode to the work circuit in combination with a shunt path external to the source from the said terminal to the work circuit, said shunt path including a second anode and a source of electromotive force and a voltage consuming device capable of storing and restoring energy together with complementary means for maintaining the negative electrode in operative condition.

14. In a system of electrical distribution in which a direct current work circuit is supplied from an alternating source through a vacuum rectifier comprising an hermetically sealed and completely exhausted container, a vaporizable reconstructing cathode, and suitable anodes therein, the combination of direct connections for supplying energy from the source to the work circuit through said rectifier in combination with a source of separate electromotive force supplying energy to the work circuit, the last named electromotive force operating through energy storing means, whereby current is passed through the rectifier therefrom at times of zero electromotive force from the supply.

15. In a system of electrical distribution a direct current work circuit including a counter-electromotive force supplied from an alternating current source through a vacuum rectifier comprising an hermetically sealed and completely exhausting container, a vaporizable reconstructing cathode and suitable anodes therein, in combination with another source of energy at higher potential than the first named source, and means for storing energy and limiting the flow of current from the last named source and for altering its phase whereby the rectifier is maintained in operating condition.

Signed at New York, in the county of New York, and State of New York, this 15th day of October A. D. 1904.

PERCY H. THOMAS.

Witnesses:
WM. H. CAPEL,
GEORGE H. STOCKBRIDGE.